United States Patent Office 3,406,808
Patented Oct. 22, 1968

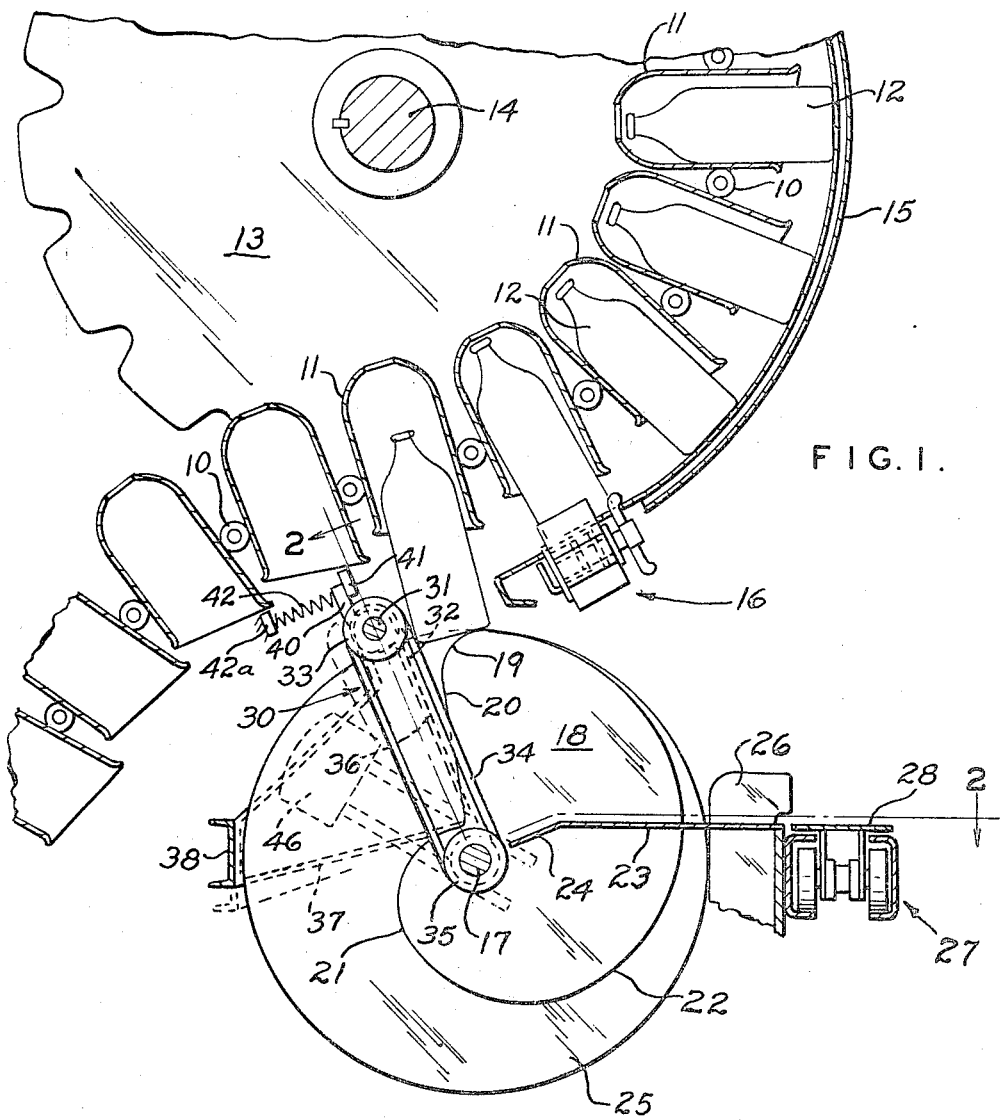

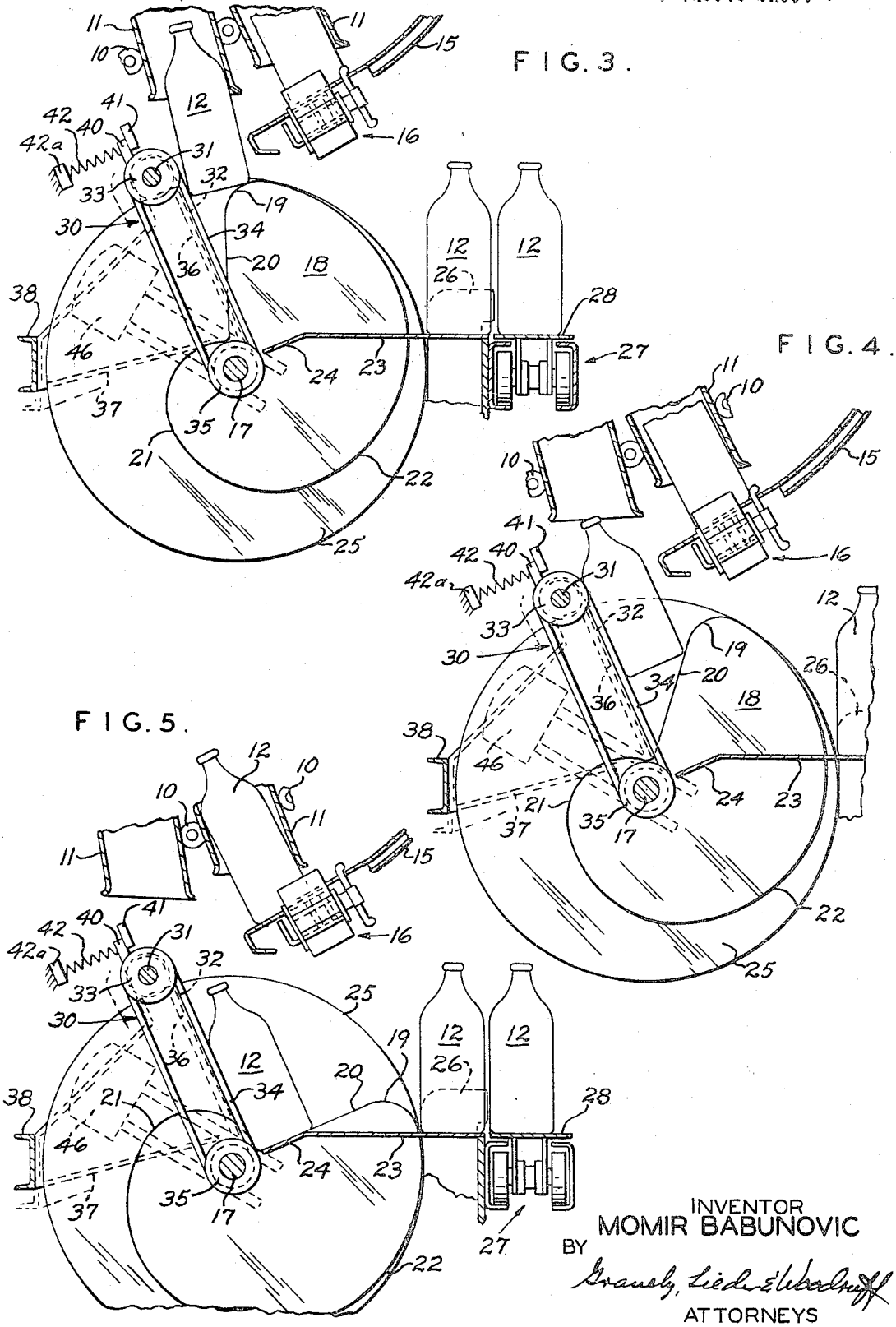

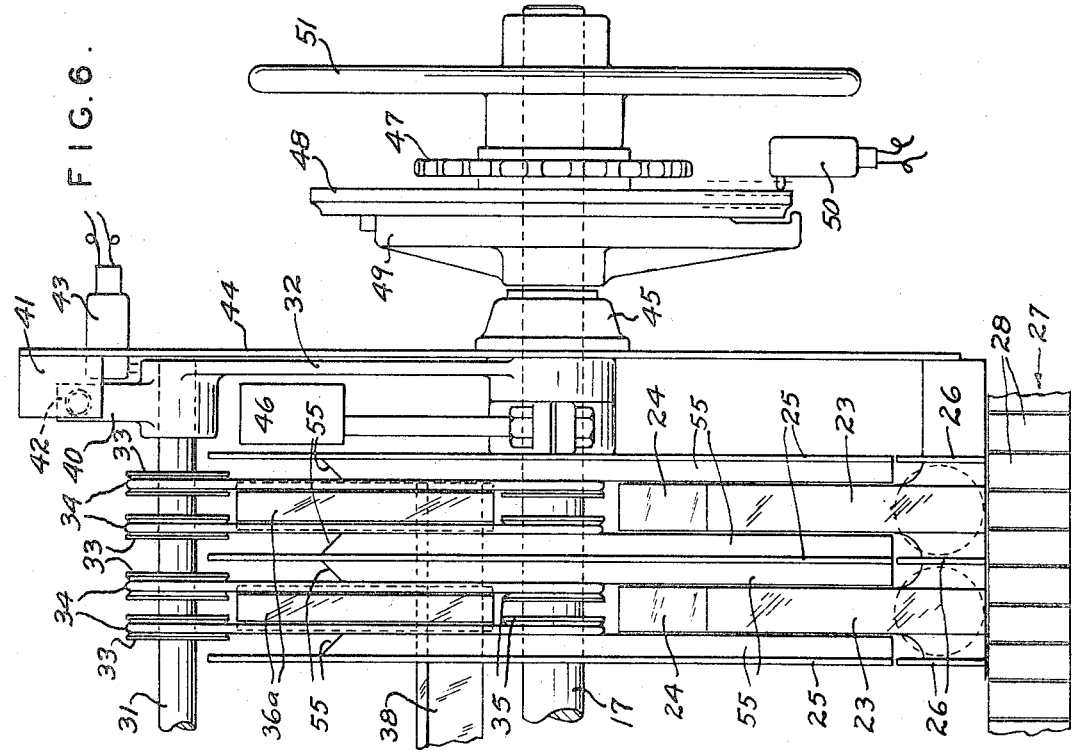
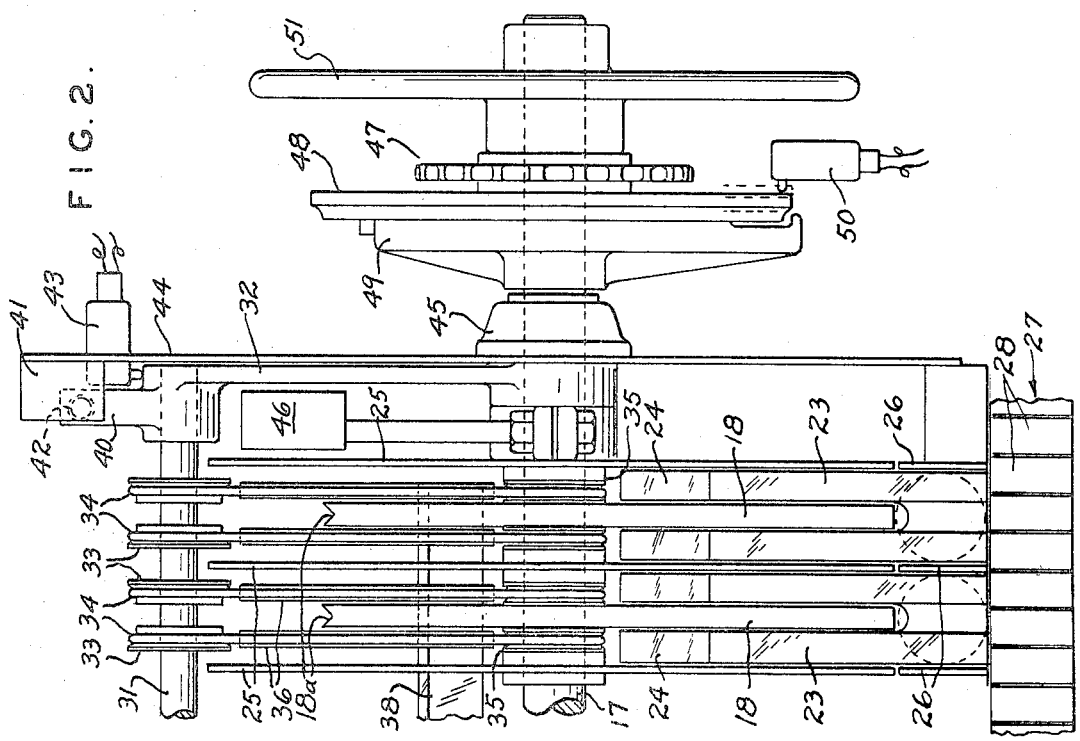

3,406,808
CONTAINER DISCHARGE APPARATUS
Momir Babunovic, Des Peres, Mo., assignor to Barry-Wehmiller Company, St. Louis, Mo., a corporation of Missouri
Filed Jan. 26, 1967, Ser. No. 611,855
5 Claims. (Cl. 198—20)

ABSTRACT OF THE DISCLOSURE

A container discharge mechanism for container washers and rinsers in which a rotary cam is provided to catch the successive containers delivered to the drop-off lip at the discharge of the washer or rinser, and friction developing guide means adjacent the cam for increasing the rapidity with which containers are withdrawn from the drop-off lip, the friction increasing means providing a substantially straight line surface which is intercepted by the rotary cam surface at an angle to form a lowering crotch which increases in its angular size as the successive containers reach the lower discharge position.

---

A container discharge apparatus having means to receive and control the exit of containers from a moving conveyor in a container washer or rinser machine to a discharge conveyor, and including moving guide means cooperating with the means to receive and control the exit such that the containers are, in addition to gravity, assisted out of the moving container rapidly and with sufficient dispatch to speed up the container discharge cycle without scuffing up or damaging containers.

The present apparatus overcomes the problems found to be present in existing apparatus such as inaccuracy of container exit from the pockets of the moving conveyor, scratching and scuffing of containers, lack of room for pieces of broken containers to clear the moving parts of the apparatus, and lack of means to simplify the handling of different sizes of containers in the same apparatus. Certain of the deficiencies in prior apparatus are critical to the speed at which the containers can be discharged and cleared before following containers reach the discharge zone.

The objects of the present apparatus are to provide a new arrangement of components which will overcome the problems and deficiencies of prior apparatus and increase the speed of container discharge cycles and the ability of the apparatus to handle containers of different sizes. Certain preferred forms of the apparatus will be disclosed in the following specification which pertains to the several views of the accompanying drawings, wherein:

FIG. 1 is a side view, partly in elevation and partly in section, showing a preferred form of apparatus for practicing the invention;

FIG. 2 is a view taken along line 2—2 in FIG. 1;

FIGS. 3, 4 and 5 are side views, partly in section, showing a sequence of stages in the discharge cycle of the apparatus of FIG. 1; and FIG. 6 is a view similar to FIG. 2, but showing a modified arrangement of components in the apparatus.

The container discharge apparatus herein may be employed in conjunction with various froms of container conditioning devices and machines; but for purposes of illustration of the principles of the present apparatus the following description of the invention will be presented in an environmental setting dealing with the discharge of bottles from a bottle washing machine. It is, of course, understood that the generic term "containers" shall be taken to include glass bottles of all types, as well as other containers which are directed through washing or rinsing machines prior to being filled.

Attention will be directed to FIGS. 1 and 2 which show a typical discharge area of a washer in which there is an endless bottle carrier indicated at 10. The carrier comprises a plurality of bottle pockets 11 adapted to receive bottles 12 therein. The conveyor 10 is trained over a suitable sprocket wheel 13 which is mounted on a shaft 14 bearinged in the apparatus in a manner understood and therefore not shown herein. The endless carrier 10 passes adjacent a bottle retainer and shield wall 15, and this wall extends in a direction parallel with the path of the carrier down to an adjustable drop off lip 16 which is shown and described in a co-pending application Serial No. 463,159 filed on June 11, 1965, in the names of Babunovic and Goessmann.

At a suitable place below the drop off lip 16 the apparatus is provided with a shaft 17 which extends widthwise so as to include as many bottle carriers 10 as is desired. The shaft supports a plurality of discharge cams 18 which are characterized by having an apex surface 19 followed by a radially directed surface 20 along which the bottom of the bottles is adapted to slide. The cam is further characterized by having a continually curved surface in which the portion 21 initiates the pushing of bottles upwardly along a predetermined path having a slight rise therein, and the remaining surface 22 continues the pushing of the bottles outwardly beyond the reach of the discharge cam along a predetermined path. The bottle discharge path is provided by a fixed plate 23 having an initial portion 24 adjacent the shaft 17 which is bent or directed at an angle to the remainder of the plate which is positioned in a horizontal plane. The plate 23 is notched as is shown in FIG. 2 so that the discharge cams 18 may pass therethrough with sufficient clearance to take care of manufatcuring tolerances.

As can be seen in FIGS. 1 and 2, each of the discharge cams 18 is flanked by a disc guide 25, with the disc guide 25 located between two adjacent discharge cams 18 cooperating with both of the cams so as to limit the number of guides necessary. The cams 18 and guides 25 are affixed to shaft 17 to rotate therewith. The guides 25 form separate channels through which the bottles 12 are pushed by the discharge cam 18 along the plate 23. As each bottle emerges from the periphery of the two adjacent disc guides 25 it is received between other guides 26 fixed to the outer extremity of each plate 23. The guides 26 act to steady each of the bottles during the transition from the end of the plates 23 onto a discharge conveyor generally indicated at 27. The conveyor 27 may consist in an endless series of flat or table top flights 28 which present a relative smooth flat surface to support the bottom of the bottles. It is, of course, understood that a bottle reaching the outer end of plate 23 between the guides 26 will not be moved onto the discharge conveyor until a subsequent bottle is pushed by the discharge cam 18 to a position between the guides 26. Therefore, the leading bottles will be displaced onto the discharge conveyor 27 by the following bottles.

Still with reference to FIGS. 1 and 2, the discharge of bottles 12 reaching the drop off lip 16 is controlled and assisted by means of the discharge cam apex 19 and by means of a plurality of belt cradles generally indicated at 30. The belt cradles include a swing shaft 31 suitably supported from the main shaft 17 by radial arms 32. The swing shaft 31 supports a plurality of sheaves 33 over which are trained flexible belts 34. The inner-loop of each belt 34 is trained over a similar sheave 35 mounted on the shaft 17. The working pass of each belt 34, between the shafts 31 and 17, is supported against flexing by the backup support 36, the support maintaining the working pass of the belt 34 in a substantially fixed position so that it can adequately and properly support the weight of a bottle 12 during the discharge sequence.

The backup support 36 for each of the belts 34 are part of a suitable frame 37, and the several frames 37 are secured to a cross-beam 38 by which the frames are joined as a unit for controlled movement. The purpose of joining the frames 37 by the cross-beam 38 is to take care of a safety switch feature which is necessary in the event that a bottle 12 should, for some reason, not drop completely free of a pocket 11. When this occurs the carrier 10 will continue to advance the hung or stuck bottle 12 and it is necessary immediately to stop the apparatus until the obstruction can be cleared. It is noted in FIGS. 1 and 2 that the upper end of the radius arm 32 for the swing shaft 31 is provided with a radial finger 40 which is normally held against a stop 41 by a compression spring 42 which abuts a fixed stop 42a. Therefore, when an obstruction occurs that prevents a bottle from effecting a clean discharge from a carrier pocket, the bottle thus affected will press against the swing shaft 31 and compress the spring 42. This action permits the swing shaft 31 to move and thereby actuate a safety switch 43 which is suitably wired into the power shut-off circuit for the main drive motor of the apparatus. The safety switch 43 may be suitably mounted in the side wall 44 of the apparatus, and a suitable bearing 45 is carried by the side wall for the main shaft 17. Just within the wall 45 and adjacent the radial arm 32 there is located a suitable balance weight 46 which can be circumferentially adjusted in order to place the discharge cams 18 and the guide discs in proper rotational balance. More than one balance weight may be used where necessary.

A further safety measure is provided for the subject apparatus as is shown in FIG. 2. In this case there is a sprocket 47 which is suitably driven (not shown) from a source of power in the subject apparatus so that shaft 17 can be rotated, to thereby rotate the guide 25 with the cams 18. The sprocket 47 drives through a safety clutch 48 which cooperates with a fixed clutch disc 49 fixed to the shaft 17. It is believed well understood that in this safety clutch arrangement if a load is imposed on the shaft 17 the safety clutch will throw out, or in this case, the clutch plate 48 will be thrust axially along the outer end of the shaft 17, so as to disengage the disc 49. The throw out action of the clutch plate 48 is utilized to trip a safety switch 50 which is wired into the main power source for the apparatus. After the obstruction has been cleared the safety clutch can be reset by suitable manipulation of the hand wheel 51.

As can be observed in FIGS. 3, 4 and 5, the sequence of operations for the present container discharge apparatus has been showed to advantage. The views of FIGS. 3 and 4 show the discharge cam 18 when advanced a few degrees beyond the position shown in FIG. 1 so that the bottom end of the bottle 12 is now partly resting on or adjacent the cam apex 19 and partly resting against an adjacent pair of belts 34. The belts are of flexible friction type material which will assert a downward drag on the bottle 12, whereas the radial surface 20 of the cam 18 is utilized to support the bottom of the bottle 12. In FIG. 4 a substantial length of the side wall of the bottle is now cradled between the pair of adjacent belts 34 so that the downward travel of the bottle is more firmly subject to the friction drag action of the belts 34. It must be appreciated that the belts 34 have a lineal movement along the backup supports 36 due to the rotation of the pulley 35 with the shaft 17.

FIG. 5 illustrates the end of the bottle discharge sequence insofar as the action of the belts 34 is concerned. From this point on the discharge cam 18 takes over and the cam surface portions 21 and 22 thereof move the bottle 12 upwardly along the plate portion 24 so that the bottle arrives in an erect position for movement horizontally along the plate 23 to a position where the apex 19 of the cam has fully displaced the bottle 12 beyond the circumference of the guide discs 25. The bottle 12 comes to rest at this point between the auxiliary guides 26 and the arrival of subsequent bottles 12 at the position of the auxiliary guides 26 cause the previous bottle to be pushed onto the conveyor 27 where it is taken away for subsequent handling. It has been shown in the series of sequence views that the discharge cam 18 is provided with a notch 18a (see FIG. 2) in its peripherial face. The notch 18a is intended to stabilize the bottles 12 since the notch will present two spaced surfaces to the normal round bottle side wall, thereby tending to keep each bottle centered over each cam. The apparatus is intended to be used on different diameter bottles and containers, and for the smaller diameter bottles the notch 18a might be entirely sufficient, but as the bottles' diameter increases it is necessary to utilize additional guide means which are, in this case, in the form of discs 25. The discs 25 affixed to shaft 17 are of sufficient radial size to include the entire reach of the discharge cam 18 along the plate 23.

Turning now to FIG. 6 there is shown a modification of the apparatus above described in connection with FIGS. 1 and 2. Whenever possible the same reference numerals will be applied to the same parts and components as are shown and described in FIG. 2, and only so much of the disclosure in FIG. 6 will be described as will make it clear what the modifications comprise. The principal modification in the apparatus of FIG. 2 is in the substitution for the single body of each of the discharge cams 18 which are independent of the guide discs 25, of discharge cam bodies 55 which are suitably secured to the guide discs 25. In this arrangement, the facing surfaces of a pair of guide discs 25 carry the discharge cams 55 and the belt cradles 30 are located in the plane between the cam discs 55. This modification necessitates altering the backup supports 36 as shown in FIG. 2 so that these supports now become unitary supports 36a with respect to the pairs of adjacent belts 34. The supports 36a are mounted in substantially the same manner from a common crossbeam 38. In other respects, the description heretofore given relating to the safety switches 43 and 50 has not been substantially changed.

There has been disclosed in the foregoing means for promoting the uniform and simultaneous discharge of bottles forming a plurality of endless carriers 10 so that the cycles of bottles discharged can be increased for greater discharge capacity without, at the same time, increasing the hazard normally assumed to be present in working with glass containers. The discharge promotion means is in the form of jointly cooperable components, one of which is the discharge cam 18 that is preferably made of a non-metallic material such as Nylatron. Of course, any other suitable material might be utilized which will have low frictional characteristics and dimensional stability so as to be able to work in harmony with manufactured parts such as would be normally incorporated in container washers. The other jointly cooperable means is the belt cradles 30 in which the working pass 34 of two adjacent belts provide a cradling surface having a relative high frictional characteristic so that a drag or pull can be asserted on the side wall of the container 12 to assist the normal gravitational effect.

It can readily be appreciated from an inspection of FIGS. 3, 4 and 5 that the rotation of the discharge cam 18 causes the radial surface 20 thereon to move angularly outwardly or in a clockwise direction relative to the working pass 34 of the belt cradles, and this relationship continues so that the crotch formed between the surfaces 20 and 34 increases and permits the bottom of the bottle to descend deeper and deeper until the position in FIG. 5 is reached. It is, of course, desirable that each bottle 12 from a multiple of pockets 11 be brought to the drop-off lip 16 at substantially the same time, and that all of the bottles should drop simultaneously or in such a manner that all are clear of the back edge of the pockets 11, thereby assuring freedom from damage to the bottles and stoppage of the apparatus.

Accordingly, the frictional drag or pull to be asserted by the belt surfaces 34 can be predetermined and provided for through proper selection of the size of the sheaves 35 on the main shaft 17. In this manner, the lineal speed of the belt surfaces 34 can be coordinated with the radial movement of the cam surfaces 20 so that an optimum rate of discharge of the containers is obtained.

While the foregoing description has referred to certain preferred embodiments of the present invention, it will be apparent to those skilled in the art that numerous changes may be made in the details and arrangement of the various components and parts, all without departing from the scope of the claims which are appended hereto.

What is claimed is:

1. Container discharge apparatus comprising a first guide along which containers are moved, said first guide having a drop-off lip for the containers, jointly moving cooperable means adjacent said lip to catch the containers moved past said lip and lower the containers to a position lower than said lip, said jointly moving cooperable means including a rotary cam member having an apex surface upon which containers first engage and a radially directed surface along which containers move, and a friction increasing member movable between a starting position adjacent the containers first engagement with the apex surface of said cam member and a position generally radially inwardly thereof with respect to the axis of cam rotation, a container discharge conveyor adjacent said lower position, and other means to transfer the containers from said lower position to said discharge conveyor.

2. The apparatus of claim 1 in which said friction increasing member is a flexible endless belt operable to engage and frictionally drag the containers into following said radially directed surface.

3. The apparatus of claim 1 in which one of said members is relatively yieldable with respect to the other.

4. The apparatus of claim 1 in which said rotary cam member has other surfaces which, in part, comprise said other means to transfer the containers from the lower position to said discharge conveyor.

5. The apparatus of claim 1 in which said friction increasing member provides a substantially straight line surface presented to the containers from adjacent said drop-off lip to the axis of cam rotation, and said radially directed surface of said rotary cam intersecting said straight line surface and moving relative thereto to describe a progressively increasing angle between said drop-off lip and the axis of cam rotation, said straight line surface and said radially direct cam surface defining a crotch into which the containers move, and said crotch moving in accordance with the progressive angular increase.

References Cited
UNITED STATES PATENTS 3,178,005   4/1965   Read _____ 198—25

RICHARD E. AEGERTER, *Primary Examiner.*